United States Patent Office 3,417,682
Patented Dec. 24, 1968

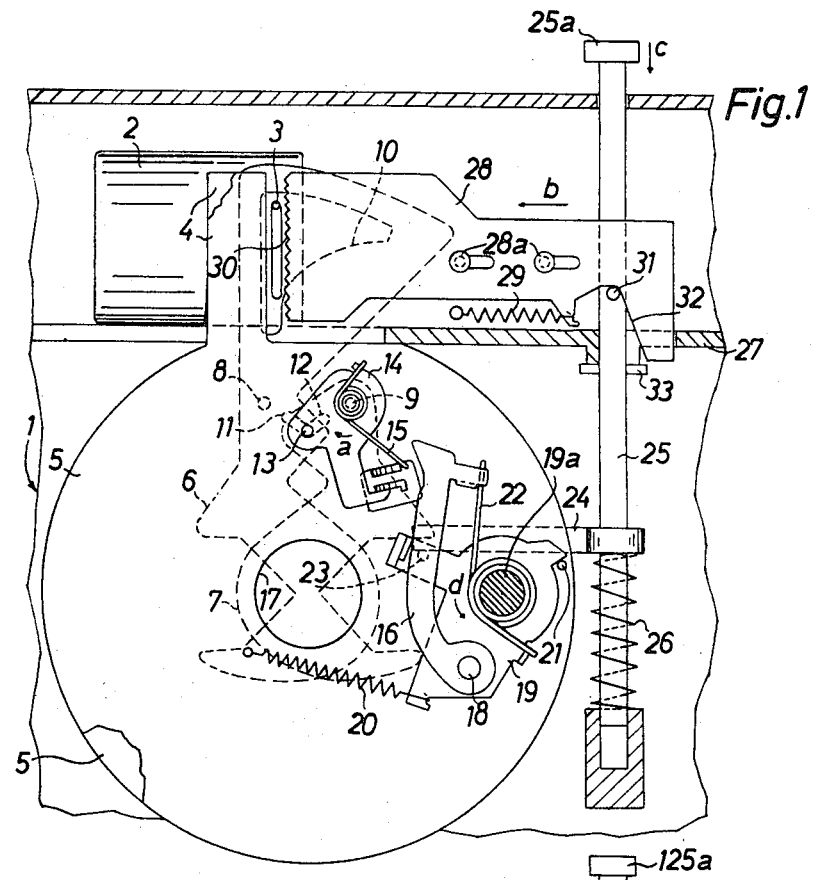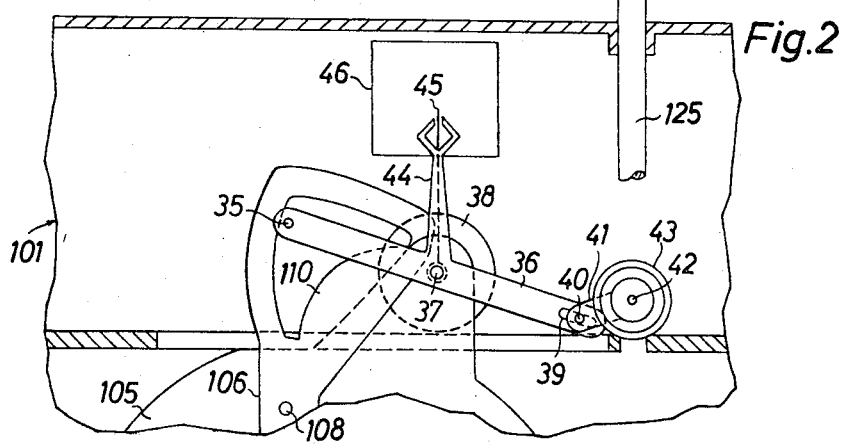

3,417,682
EXPOSURE CONTROL FOR PHOTOGRAPHIC CAMERAS HAVING STATIONARY SUPPORT FOR INDICATOR NEEDLE
Franz Landbrecht, Unterhaching, Munich, Germany, assignor to Agfa-Gevaert Aktiengesellschaft, Leverkusen, Germany
Filed Nov. 30, 1965, Ser. No. 510,599
Claims priority, application Germany, Dec. 17, 1964, A 22,969
10 Claims. (Cl. 95—10)

ABSTRACT OF THE DISCLOSURE

One of two pivotable blades of a diaphragm shutter for photographic cameras is provided with a tracking portion which can engage the needle of an exposure meter to thus insure that the aperture size is a function of scene brightness. The blades are biased to uncocked positions by a spring and are moved to cocked positions by an impeller. A fixed stop serves as an abutment for the needle when the latter is engaged by the tracking portion of the one blade.

---

The present invention relates to photographic cameras in general, and more particular to an improved exposure control for photographic cameras with built-in exposure meters. Still more particularly, the invention relates to an improved exposure control for such photographic cameras.

It is an important object of the present invention to provide a very simple, rugged and accurate operative connection between the indicator of an exposure meter and a diaphragm shutter of a photographic camera and to construct the operative connection in such a way that the size of the diaphragm opening and/or the exposure time is invariably an accurate function of the intensity of light which influences the exposure meter.

Another object of the invention is to provide a very simple cocking mechanism for the diaphragm shutter of a photographic camera wherein the position of an indicator forming part of a moving-coil instrument in the exposure meter is tracked to determine the maximum size of the diaphragm opening for a particular light intensity.

A further object of the invention is to provide a novel arresting structure for the indicator of the moving-coil instrument which insures that the indicator is held still at the time it is being tracked by that part which determines the optimum size of the diaphragm opening for a particular exposure.

An additional object of the invention is to provide a still camera which embodies the above features and wherein the determination of the size of the diaphragm opening may be carried out in a fully automatic way, namely, exclusively in dependency on the position of the indicator of the moving-coil instrument in the exposure meter, or by hand whereby the latter determination of the size of the diaphragm opening may but need not be the same as the one which would be made if the diaphragm were adjusted in a fully automatic way.

A concomitant object of the invention is to provide a novel operative connection between the release trigger and the cocking mechanism of the improved camera.

An ancillary object of my invention is to provide a very inexpensive exposure control for photographic cameras and to construct the exposure control in such a way that its parts occupy little room and also that it allows for fully automatic or semiautomatic selection of the size of the diaphragm opening.

Another object of the invention is to provide a photographic camera wherein the diaphragm blades determine the size of the light-admitting opening and the exposure time in a simple way.

Briefly stated, one feature of my present invention resides in the provision of a photographic camera which comprises a diaphragm shutter including a plurality of cooperating blades movable from an uncocked position in which the diaphragm shutter is closed to a plurality of cocked positions in each of which the diaphragm defines a light-admitting opening of a different size, a tracking portion provided on one of the blades, an exposure meter including an indicator movable to a plurality of positions each of which is indicative of a different light intensity and being located in the path of the tracking portion to select that cocked position which is a function of such light intensity, biasing means for normally maintaining the blades in uncocked position, and cocking means for moving the blades from uncocked position. The cocking means comprises a movable drive member or cocking member which is operatively connected with the blades and propelling means operative to move the drive member against the action of the biasing means until the tracking portion engages the indicator to prevent further movement of blades from their uncocked position and to thereby determine the maximum size of the diaphragm opening for a particular light intensity. The propelling means is arranged to thereupon release the drive member so that the biasing means can return the blades to their uncocked position to thereby close the diaphragm shutter and to thus complete the exposure.

The indicator can constitute the needle of a moving coil instrument and is then secured for rotation with the shaft of the instrument. Alternatively, the camera may further comprise a selector which carries the indicator and is movable into registry with the needle of the moving-coil instrument to thereby place the indicator into a position which is a function of the light intensity indicated by the needle. The selector may be provided with a pointer or needle which can be moved into registry with the needle of the moving-coil instrument.

The propelling means may be mounted on an intermediate lever which is rockable by the release trigger of the camera.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawings, in which:

FIG. 1 is a somewhat schematic front elevational view of a portion of a still camera which embodies my invention, the housing of the camera being partially broken away; and FIG. 2 is a similar fragmentary schematic front elevational view of a modified camera.

Referring first to FIG. 1, there is shown a portion of a still camera comprising a housing 1 which accommodates a built-in exposure meter including a moving-coil instrument 2 of known design. The instrument 2 comprises a rotary shaft which is controlled by the coil and carries an indicator in the form of a needle 3. In the exposure meter of FIG. 1, the shaft of the instrument 2 is assumed to be horizontal, and its axis is located in the plane of the drawing. The indicator 3 is rockable in a plane which is normal to the plane of FIG. 1. The instrument 2 is connected in circuit with a photosensitive resistor or cell (not shown) in a manner well known from the art, and the admission of light to such photosensitive element may be controlled by an auxiliary diaphragm, not shown, to take into consideration the sensitivity of the film which is being used in the camera.

The plane in which the indicator 3 is movable about the axis of its shaft is located in front of two fixed stops 4 which are disposed in parallel planes and are slightly spaced from each other. These stops 4 constitute the extensions of two circular disk-shaped panels 5 which together constitute a support for several component parts of the structure shown in FIG. 1. The stops 4 can cooperate with a reciprocable arresting member 28 which will be described later and which serves to clamp the indicator 3 against the stops. It will be seen that the arresting member 28 and the stops 4 are located at the opposite sides of the indicator 3, namely, at the opposite sides of the plane in which the indicator 3 can move in response to changes in intensity of light which impinges against the aforementioned photosensitive element.

The space between the disk-shaped panels 5 accommodates a diaphragm shutter including a pair of relatively movable diaphragm blades 6 and 7. The blade 6 is integral with a flat tracking portion 10 which can be moved into engagement with the indicator 3 after the latter is clamped between the stops 4 and arresting member 28. The blades 6, 7 are normally held in an uncocked position in which the diaphragm shutter is closed, but they can be moved to a plurality of cocked positions each of which corresponds to a diaphragm opening of a different size. The diaphragm opening registers with a pair of coaxial apertures 17 which are provided in the panels 5 and serve to admit light toward the foremost unexposed film frame whereby the light must pass through the diaphragm opening. The diaphragm blades 6, 7 are respectively rockable on pivot pins 8 and 9 which are carried by the panels 5, and the two blades are provided with mutually inclined overlapping elongated slots 11, 12 which receive a rocking or cocking pin 13 forming part of a cocking lever or drive member 14 which is mounted on the pin 9. The cocking lever 14 is biased by a torsion spring 15 which is convoluted around the pin 9 and tends to bias this lever to an idle position corresponding to the uncocked position of the blades 6, 7. The means for moving the cocking lever 14 from its idle position (against the bias of the spring 15 and in the direction indicated by an arrow $a$) comprises a propelling member or arm 16 which is rockable on a pin 18 carried by an intermediate lever 19. The lever 19 is rockable on a shaft 19$a$ which is mounted on the panels 5, and the shaft 19$a$ also carries a torsion spring 22 which tends to rock the propelling arm 16 in a counterclockwise direction, as viewed in FIG. 1. A helical spring 20 operates between one of the panels 5 and the intermediate lever 19 to normally maintain the latter in abutment with a fixed projection 21 forming part of the housing 1 or of one of the panels 5. The intermediate lever 19 further carries a pin 23 which extends into the path of an extension 24 forming part of a reciprocable release trigger 25 which is provided with a manually depressible head or knob 25$a$. The release trigger 25 is biased by a resetting spring 26 which tends to maintain it in the starting position of FIG. 1. In such starting position, a projection 33 of the trigger 25 abuts against a fixed partition 27 of the housing 1.

The aforementioned arresting member 28 is reciprocably guided by a pair of studs 28$a$ which are secured to the housing 1 and is permanently biased by a helical spring 29 which tends to shift it in a direction to the left as indicated by the arrow $b$. Such movement of the arresting member 28 is normally opposed by a follower pin 31 which is secured to the release trigger 25 and can track an inclined cam face 32 of the member 28. The bias of the resetting spring 26 exceeds the bias of the spring 29 so that, when the release trigger 25 assumes its starting position, a toothed, serrated or otherwise roughened clamping face 30 of the arresting member 28 is automatically held away from the indicator 3.

In order to make an exposure, the user trains the photosensitive element of the exposure meter upon the subject or scene to be photographed so that the indicator 3 assumes an angular position which is a function of the intensity of incoming light. The user then depresses the head 25$a$ of the release trigger 25 (arrow $c$) so that the follower 31 moves downwardly, as viewed in FIG. 1, and allows the arresting member 28 to follow the bias of the spring 29 (arrow $b$). This enables the roughened clamping face 30 of the arresting member 28 to clamp the indicator 3 against the stops 4 and to hold the indicator still preparatory to engagement by the tracking face of the tracking portion 10. As the operator continues to press the head 25$a$, the extension 24 of the release trigger 25 engages the projection 23 of the intermediate lever 19 and rocks the latter in a counterclockwise direction (arrow $d$). The spring-biased propelling arm 16 then propels the cocking lever 14 against the bias of the spring 15 (arrow $a$) whereby the pin 13 causes the diaphragm blades 6, 7 to move in opposite directions until the tracking portion engages the clamped indicator 3. The blades 6, 7 define a diaphragm opening which admits light against the foremost unexposed film frame, and the maximum size of the diaphragm opening depends on the angular position of the indicator 3, i.e., the diaphragm opening will reach its maximum size when the blades 6, 7 cannot move further away from their uncocked position because the tracking portion 10 of the blade 6 abuts against the indicator 3. Thus, the size of the diaphragm opening in an accurate function of the intensity of light which determines the angular position of the indicator 3.

The spring-biased propelling arm 16 then bypasses the cocking lever 14 and allows the latter to follow the bias of the spring 15 which immediately returns the blades 6, 7 to their uncocked position and thereby closes the diaphragm shutter. During such movement of the blades 6 and 7, the cocking lever 14 is caused to rock in the direction counter to that indicated by the arrow $a$. The exposure time varies with changes in the size of the diaphragm opening and is also a function of the intensity of light which influences the angular position of the indicator 3.

If the user thereupon releases the head 25$a$ and thus allows the trigger 25 to return to starting position under the action of resetting spring 26, the follower 31 engages the inclined cam face 32 and retracts the arresting member 28 against the bias of the spring 29 so that the clamping face 30 moves away from the indicator 3 and the latter is again free to change its angular position in dependency on the intensity of incoming light. The spring 20 then returns the intermediate lever 19 and the propelling arm 16 to the idle positions shown in FIG. 1 so that the camera is ready to take the next picture.

Referring now to FIG. 2, there is shown a portion of a modified still camera which comprises a housing 101 for a pair of fixed supporting platens 105 (only one shown) carrying a diaphragm shutter including a pair of blades of which only the blade 106 is shown in FIG. 2. The blade 106 comprises a tracking portion 110 and is rockable on a pin 108. The manner in which the head 125$a$ of the release trigger 125 may be depressed by hand to make an exposure is the same as described in connection with FIG. 1; therefore, the cocking means 14, 16, the intermediate lever 19 and the spring 15 were left out in FIG. 2 for the sake of clarity. The size of the diaphragm opening is selected semiautomatically and the indicator 3 of FIG. 1 corresponds to an indicator 35 which is mounted on one arm of a selector lever 36. This lever is rockable on the shaft 37 of a moving-coil instrument 38, and the shaft 37 is rigidly connected with a second indicator in the form of a needle 45. The angular position of the needle 45 reflects the intensity of light which comes from a viewed scene or subject and impinges against the photosensitive element which is connected in the circuit of the instrument 38. The selector lever 36 can also be mounted on a shaft which is coaxial with the shaft 37 of the instrument 38. The other arm of the selector lever 36 is formed with an elongated slot 39 which receives a rocking pin 40 provided on an arm 41 extending radially from the shaft 42 of a manually adjustable control wheel 43. The selector lever 36 further comprises a needle or pointer 44 which may be moved into registry with the needle 45 of the moving-coil instrument 38 to thereby place the indicator 35 into an angular position which is a function of the intensity of incoming light. The needles 44, 45 are preferably located behind the window 46 of a viewfinder so that, by looking through the window 46 and by simultaneously manipulating the control wheel 43, the user can readily move the needle 44 into exact registry with the needle 45. The end portion of the needle 44 preferably resembles a diamond to facilitate accurate alignment with the needle 45.

If the user thereupon depresses the head 125a of the release trigger 125, the cocking mechanism causes the blades of the diaphragm shutter to pivot with reference to each other until the tracking portion 110 of the blade 106 engages the indicator 35. Thus, the indicator 35 again determines the maximum size of the diaphragm opening and the length of the exposure time.

The arresting member 28 is not needed in the camera of FIG. 2 because the needle 45 of the moving coil-instrument 38 need not be clamped. However, the provision of such arresting member is not excluded. A very important advantage of the structure shown in FIG. 2 is that the size of the diaphragm opening may but need not be selected as an exact function of the intensity of incoming light, i.e., the user might decide not to follow the reading furnished by the exposure meter, for example, if he wishes to overexpose or to underexpose the film.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a photographic camera, a diaphragm shutter comprising a plurality of cooperating blades movable from an uncocked position in which said diaphragm shutter is closed to a plurality of cocked positions in each of which said diaphragm shutter defines a light-admitting opening of a different size, one of said blades comprising a tracking portion; an exposure meter including an indicator movable along a predetermined path to a plurality of positions each of which is indicative of a different light intensity, said indicator being located in the path of said tracking portion to select a cocked position which is a function of said intensity; biasing means for normally maintaining said blades in uncocked position; cocking means for moving said blades from uncocked position, including a movable drive member operatively connected with said blades and propelling means operative to move said drive member against the action of said biasing means until said tracking portion engages said indicator, said propelling means being arranged to thereupon release said drive member so that said biasing means can return the blades to uncocked position; and stationary stop means extending along said indicator and adjacent thereto against which said indicator abuts during engagement by said tracking portion.

2. A structure as set forth in claim 1, wherein said exposure meter comprises a moving coil instrument having a rotary shaft and said indicator is fixed to and is rotatable with said shaft.

3. In a photographic camera, a diaphragm shutter comprising a plurality of cooperating blades movable from an uncocked position in which said diaphragm shutter is closed to a plurality of cocked positions in each of which said diaphragm shutter defines a light-admitting opening of a different size, one of said blades comprising a tracking portion; an exposure meter including an indicator movable to a plurality of positions each of which is indicative of a different light intensity, said indicator being located in the path of said tracking portion to select a cocked position which is a function of said intensity; biasing means for normally maintaining said blades in uncocked position; cocking means for moving said blades from uncocked position, including a movable drive member operatively connected with said blades and propelling means operative to move said drive member against said indicator, said propelling means being arranged to thereupon release said drive member so that said biasing means can return the blades to uncocked position; and a support for said diaphragm shutter, said biasing means and said cocking means, said support comprising a pair of spaced panels having extensions located at the opposite sides of said tracking portion and together constituting a fixed stop against which said indicator abuts during engagement by said tracking portion.

4. A structure as set forth in claim 3, wherein said panels are provided with registering apertures whose size at least approximates the maximum size of said opening, said opening being in registry with said apertures.

5. A structure as set forth in claim 3, wherein said panels are parallel to each other and said blades are located between said panels, said drive member comprising a cocking lever pivotably mounted on said support and said biasing means comprising a return spring connected with said cocking lever, said operative connection comprising pin and slot means provided on said lever and said blades.

6. A structure as set forth in claim 1, wherein said exposure meter further comprises a moving-coil instrument having a second indicator which is automatically displaced to a position indicative of said intensity, and selector means connected with said first named indicator and movable by hand to register with said second indicator whereby the position of said first named indicator is a function of said intensity.

7. A structure as set forth in claim 6, wherein said selector means comprises a lever having a needle which is movable into registry with said second indicator.

8. A structure as set forth in claim 1, further comprising a spring-biased release trigger for operating said propelling means.

9. A structure as set forth in claim 8, further comprising an intermediate lever arranged to transmit motion between said trigger and said propelling means, said propelling means being pivotably supported by said intermediate lever.

10. A structure as set forth in claim 8, wherein said stop means is located at one side of said indicator and further comprising an arresting member located at the other side of said indicator and being controlled by said trigger to clamp the indicator against said stop means and to thereby hold still the indicator preparatory to engagement of said indicator by said tracking portion in response to movement of said trigger from a starting position.

References Cited

UNITED STATES PATENTS

| | | | |
|---|---|---|---|
| 3,302,545 | 2/1967 | Bakke | 95—10 |
| 3,301,153 | 1/1967 | Ataka | 95—10 |
| 3,250,193 | 5/1966 | Horton | 95—10 |
| 3,234,867 | 2/1966 | Sho et al. | 95—10 |
| 3,233,531 | 2/1966 | Fairbank | 95—10 |
| 3,230,856 | 1/1966 | Sho | 95—10 |

NORTON ANSHER, *Primary Examiner.*

R. A. SCHROEDER, *Assistant Examiner.*